United States Patent [19]
Elliott

[11] Patent Number: 5,659,564
[45] Date of Patent: Aug. 19, 1997

[54] METHOD AND APPARATUS FOR MAINTAINING A FURNACE STACK

[75] Inventor: Jack R. Elliott, Etowah, Tenn.

[73] Assignee: Schuller International, Inc., Denver, Colo.

[21] Appl. No.: 425,546

[22] Filed: Apr. 20, 1995

[51] Int. Cl.[6] .................................. C03B 5/02; C03B 37/09
[52] U.S. Cl. .................................. 373/27; 373/28; 373/31; 373/33; 65/27; 65/327; 266/44
[58] Field of Search .................. 373/27–28, 30–33, 373/35, 5, 115, 118; 65/27, 29, 327, 335; 266/44

[56] References Cited

U.S. PATENT DOCUMENTS

| | | | |
|---|---|---|---|
| 2,188,927 | 2/1940 | Slayter | 65/327 |
| 2,790,019 | 4/1957 | Stalego | 373/35 |
| 2,919,297 | 12/1959 | Augsburger | 373/35 |
| 3,920,430 | 11/1975 | Carey | 65/1 |
| 4,023,950 | 5/1977 | Glaser | 65/29 |
| 4,146,373 | 3/1979 | Sullivan et al. | 65/1 |
| 4,438,518 | 3/1984 | Gaul et al. | 373/39 |
| 4,678,491 | 7/1987 | Tsai | 65/27 |

*Primary Examiner*—Tu B. Hoang
*Attorney, Agent, or Firm*—Cornelius P. Quinn

[57] ABSTRACT

The bottoms of exhaust stacks and systems on glass melting furnaces usually collect slag that is produced by volatiles in the exhaust gases condensing out and forming a glassy substance on the cooler walls of the stacks, etc. which then runs down the walls picking up refractory and forming a slag in the lowest places. This slag often cools to hardness or a high viscosity, tough mass. It has to be removed periodically to prevent building up to the point that slag would run back into the furnace damaging the glass and removal is a hot, dirty, time consuming job. This problem is worse on oxy-fuel furnaces which the industry is trending towards for other advantages. The present invention eliminates this problem by reducing the size of the reservoir in the bottom of the stack and adding a heated bushing with an orifice that continually drains the slag from the small reservoir.

11 Claims, 3 Drawing Sheets

METHOD AND APPARATUS FOR MAINTAINING A FURNACE STACK

BACKGROUND

This invention involves apparatus and a method of draining slag caused by condensation of volatiles from furnace exhaust gases from the bottom of a furnace stack and is particularly useful on oxygen boosted and more particularly on oxy-fuel fired furnaces, e.g. oxy-fuel fired glass melters.

Furnaces fired with air-fuel typically exhaust large quantities of hot gases. Frequently, such as with glass furnaces, the hot exhaust gases contain inorganic volatiles such as sodium borate, etc. As the hot gases cool going up a stack, through a recuperator and stack, or through a regenerator and stack, some of the volatiles will condense into a liquid on the cooler, but still hot surfaces. This low melting point liquid of condensed volatiles drains down the walls of the stack, etc. and collects in a reservoir in the base or bottom portion of the stack. Periodically, it is necessary to clean out this reservoir to prevent this liquid from flowing back into the furnace through the exhaust port which causes a glass composition shift and furnace upset. Draining this slag, which also contains batch carryover, some refractory particles, and some dissolved refractory, is a difficult, hot and unpleasant job, requiring about 8 hours, more or less depending on the particular unit, for two men.

With air-gas firing, cleaning out the reservoir is necessary only infrequently because the stack is normally large in cross section to accommodate the large volume rate of exhaust and the reservoir is usually made deep to hold a lot of slag. A typical E glass air-fuel fired furnace would have a stack with an internal area of at least 3600 square inches and the depth of the reservoir, the distance between the interior of the bottom wall of the exhaust port to the interior of the bottom of the reservoir, would typically be about 36 inches, providing a reservoir having a volume of at least about 129,00 cubic inches or more. A reservoir of this size requires cleaning out about every 5-6 weeks on E glass. When melting soda-lime or sodium borosilicate glasses it is necessary to clean out the reservoir much more frequently because the volatile carry over and condensation is much greater due to the much higher soda content of the batch.

The industry is switching from air-fuel and preheated air-fuel firing to oxygen boosting and oxy-fuel firing to reduce emission problems and to reduce bottom line costs. Oxy-fuel firing is defined here as a firing system and/or process wherein at least 75 percent, preferably at least 85 percent and most preferably at least 90 percent of the oxygen needed for combustion is supplied with oxygen, industrial grade or purer, instead of air. In the most preferred oxy-fuel systems, air is present only unintentionally, i.e. due to leaks in the furnace or as impurities in the oxygen as a result of the oxygen generating system being used.

With oxygen boosting and much more so with oxy-fuel firing, the emission volume rates are lower on the furnace, but the concentration of inorganic volatiles, grams/1000 cubic feet, is higher. Also, when a furnace is converted from air-fuel firing to oxy-fuel firing the stack design and/or the actual stack is often left unchanged. With the lower volume rate of emissions, frequently at lower temperatures too, the emitted gases are cooled to a much lower temperature before they reach very far up the stack than they are in a typical air-fuel fired stack. Hence, the rates of condensation of inorganic volatiles on the walls and the collection rates of resultant slag in the bottom of the stack in an oxy-fuel fired furnace are considerably higher than in air-fuel fired furnaces, e.g. the same size reservoir described above would have to be cleaned out every 2-4 weeks when the firing is converted to an oxy-fuel system.

When the stack is redesigned and rebuilt according to the lower exhaust volume rates it must handle with oxy-fuel firing, the cross section drops to only about 730 square inches in the furnace described above. This reduces the reservoir size to less that one-fourth its previous size and requiring clean out at least 4 times as often. Thus cleaning the slag out of the stack becomes a real headache and a time consuming activity, particularly since with the lower exhaust volume from oxy-fuel firing, the bottom of the stack is cooler and tends to solidify or stiffen the slag making it more difficult to remove. A solution to this problem is definitely needed in the industry.

BRIEF DESCRIPTION OF THE INVENTION

The present invention solves the problems described above in oxygen boosted and oxy-fuel fired furnaces, and similar problems even in the exhaust systems of air or preheated air fired furnaces, by placing a heated, preferably an electrically heated, bushing in or under an opening, orifice, in or near the bottom of the stack or slag reservoir to occasionally or continuously drain the slag from a hot reservoir in the bottom section of the stack, thus requiring very little or no labor to keep the stack cleaned out or drained. Also, preferably the reservoir is made smaller and kept hotter to insure that the slag will remain fluid and drain readily. Preferably the drain bushing is made from a noble or precious metal, is heated by the electrical resistance of the bushing material, and is small to minimize cost and electrical usage.

The invention further comprises a furnace or an exhaust system on a furnace for heating a material to a high temperature comprising, a work chamber, an exhaust port and an exhaust stack, said stack communicating with said exhaust port and having a reservoir in the bottom portion for collecting slag that runs down the interior walls of said stack, said reservoir having an orifice for removing the slag in or near the bottom wall of said reservoir and a heated bushing for draining said slag out of said reservoir, said bushing having an outlet and said bushing being affixed such that said bushing communicates with said orifice and is in a sealed relationship to the exterior surface surrounding said orifice. Preferably, the orifice is in the bottom wall of the stack reservoir and the drain bushing is attached to the outside of the bottom wall of the stack under the orifice. Preferably the bushing is electrically heated, most preferably by the electrical resistance of the bushing material and the bushing itself. This invention is especially useful on oxygen boosted and oxy-fuel fired furnaces, but is also useful on any furnace exhaust stack or system that must be drained or cleaned out periodically.

DETAILED DESCRIPTION

Figure 1:
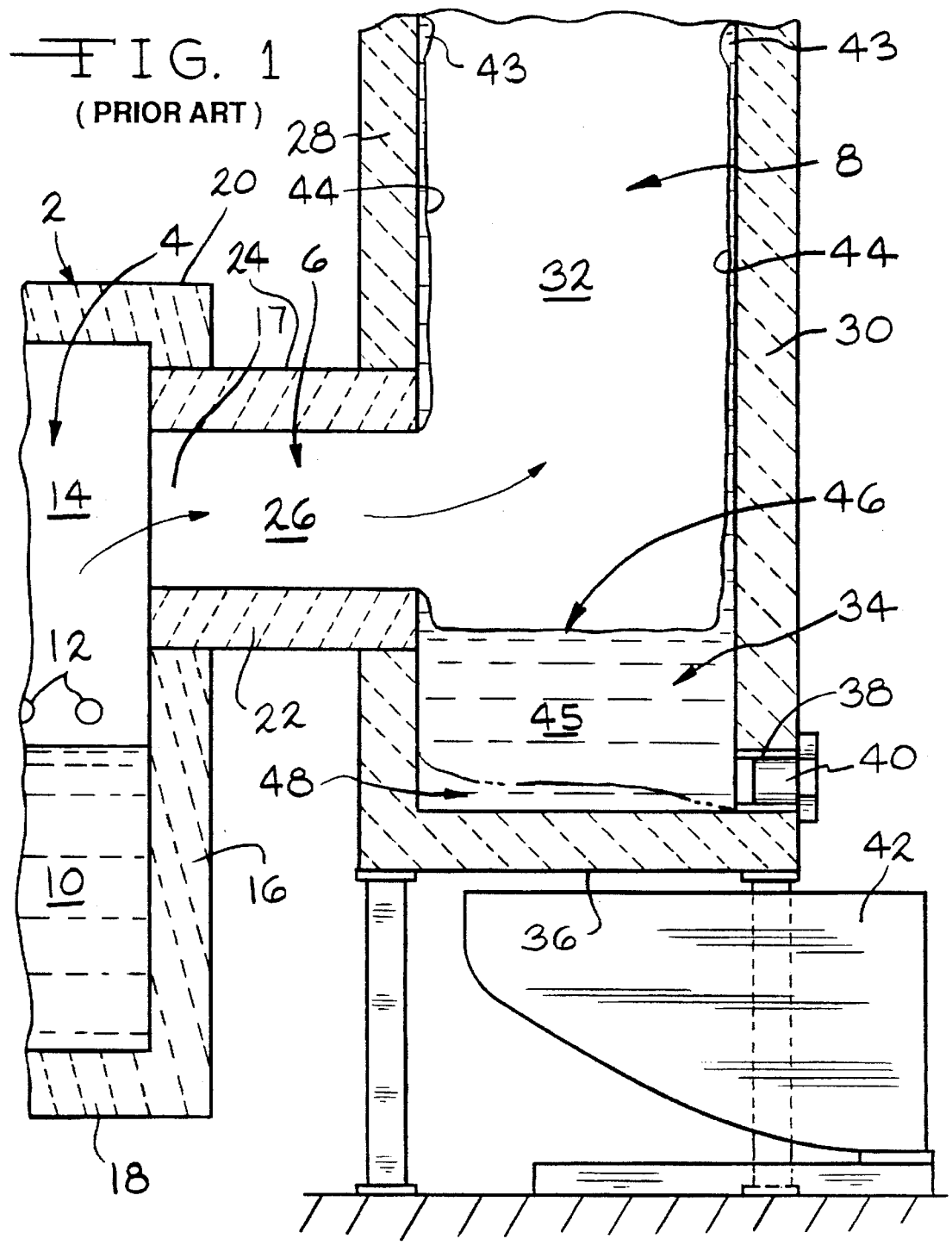
FIG. 1 is a vertical cross section of the exhaust end of a conventional glass melting furnace including the lower portion of the exhaust stack.

FIG. 1 shows in vertical cross section the upstream or exhaust end of a typical prior art glass furnace 2 called a unit melter for melting glass. The portion shown includes part of a work or melting chamber 4, having an exhaust port 6 that carries hot exhaust gases to an exhaust stack 8 which directs the gases to a point high above the ground and releases the gases to an exhaust gas emission reduction system where prudent or to the atmosphere where the gases are safe. In the upper portion of the stack and not shown can often be found a recuperator for recovering waste heat for preheating combustion air, etc. in a well known manner. In the work chamber 4, batch (not shown) is melted to form molten glass 10 by heat supplied by burners 12 located in sidewalls 14. The burners 12 are usually preheated air-fuel fired burners, a regenerative firing system, oxy-fuel fired burners or some combination of these. The remainder of the work chamber is made up of a back wall 16 having an opening therein 17 to allow hot combustion gases to exhaust from the work chamber 4 into the exhaust port 6, a bottom wall 18 and a crown 20. The exhaust port 6 has a bottom wall 22, a top wall 24 and sidewalls 26, however sometimes these are combined into a single cylindrical or oval wall. The exhaust port 6 is aligned with the opening 17 in front wall 16 and an opening in a front wall 28 of the stack 8, allowing the exhaust gases coming from the furnace to enter the stack 8. The stack 8 also has a back wall 30, two sidewalls 32, a reservoir 34 in its bottom portion and a bottom wall 36.

The stack 8 also has a clean out orifice or port 38, usually in its back wall 30, at the bottom end just above the bottom wall 36. Normally the orifice 38 is plugged with a refractory plug 40 to prevent leakage of hot exhaust gases out into the plant area around the stack, and/or to prevent cool plant air from being drawn into the stack reducing the draft capability of the stack and the temperature of the exhaust gases.

Inorganic volatiles, particularly sodium oxide, potassium oxide, boron oxide, and other oxides and sulfates, etc. are present in the combustion or exhaust gases due to the high temperature in the melter 4, particularly close to the flames from the burners 12. The exhaust gases cool as they exit the melter 4 and as the gases flow up the stack they fall in temperature to a point where the volatiles condense out as a liquid 43 onto the hot walls of the stack. This liquid, due to gravity, flows down the walls of the stack into the reservoir 34 in the bottom of the stack. The hot liquid 43 is very corrosive and it dissolves some of the refractory as it flows along the wall and also traps some of the batch particulate or carry over that is carried out of the furnace by the exhaust gases, forming an accumulation of slag or glassy liquid 45 in the reservoir 34.

When the level of slag 45 reaches a level 46, a few inches below the bottom interior surface of the exhaust port 6, the plug 40 is removed and the slag, which is usually a stiff, gooey mass like cold molasses, is drained and raked out through the orifice 38. This typically takes two men about an eight hour shift and is very hot, hard and unpleasant work. Protective gear has to be worn to prevent burns, including radiation burns, which makes the working conditions even more uncomfortable. Usually not all of the slag can be practically removed leaving residual slag 48 in the back corners and back portion of the reservoir. While the reservoir could possibly be made somewhat deeper to hold more slag and thus lengthen the time between cleanouts, it would be necessary to install a high temperature heat source in the lower portion of the stack to prevent the slag from solidifying and making removal impractical.

The present invention eliminates these problems by installing a high temperature bushing in conjunction or communication with an orifice in the bottom portion of the stack and periodically, or preferably continuously, draining the slag accumulating in the bottom of the stack, thus eliminating periodic manual cleanouts and the attendant costs and unpleasantness of that agonizing function. It is enhanced by reducing the size of the reservoir to keep the reservoir area hotter which improves draining of the slag. This invention is especially useful on oxygen boosted furnaces, and more so on oxy-fuel fired, furnaces, sometimes called 100 percent oxygen—fuel fired furnaces, where the exhaust emissions are only about 20 percent or so that of air-fuel fired furnaces, and where the concentration of inorganic volatiles in the exhaust gases is usually substantially higher than in the exhaust from the air-fuel fired furnaces. On some of the oxy-fuel fired furnaces, the exhaust port cross sectional area and the cross sectional area of the stack are substantially reduced to compensate for the reduced volume rate of exhaust gases passing therethrough.

Figure 2:
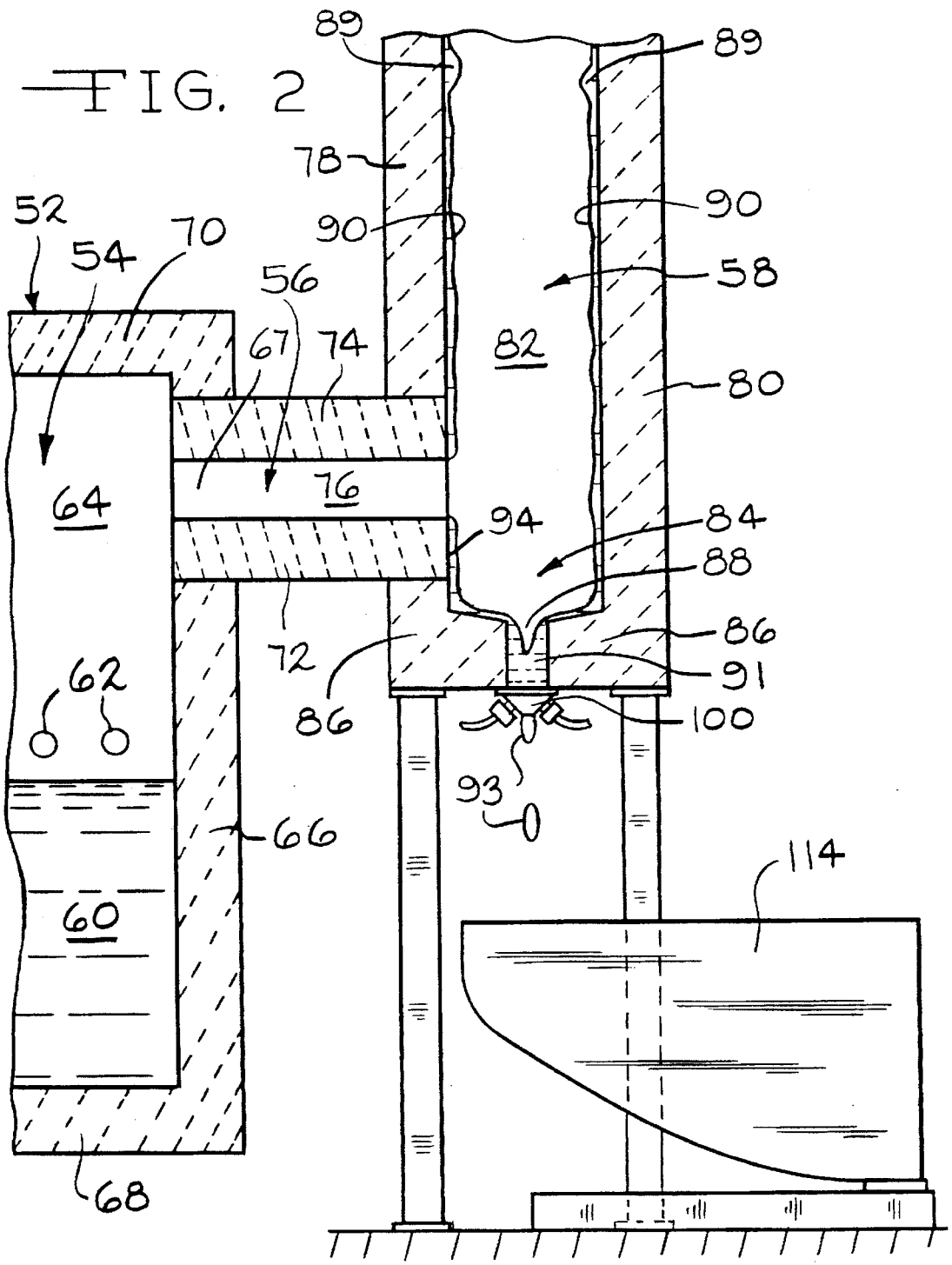
FIG. 2 is a vertical cross section of the exhaust end of a glass melting furnace, including a lower portion of the exhaust stack, but modified in accordance with the preferred embodiment of the present invention.

A preferred embodiment of the present invention is shown in FIG. 2 and is the exhaust end (back end) of an oxy-fuel fired furnace 52 having a melting chamber 54, an exhaust port 56 of substantially reduced cross sectional area, compared to the furnace of FIG. 1, a stack 58 (partially shown) of substantially reduced area, compared to the stack shown in FIG. 1, and equipped and operated according to the present invention. The melting chamber 54, which is only partially shown, contains molten glass 60 which results from melting batch (not shown) in a conventional manner with heat from oxy-fuel burners 62, with or without conventional under glass electric boosting. The melting chamber comprises sidewalls 64, a back wall 66 having an opening 67 therein for exhaust, which is part of the exhaust port 56, a bottom wall 68 and a crown wall 70, all the walls being of conventional refractory materials.

The exhaust port or duct 56 comprises a bottom wall 72, side walls 76 and a top wall 74. Again, the exhaust port can be tubular in which case all of these walls are combined in a single cylindrical or oval wall. The walls are made of refractory materials in a known manner. The exhaust port opening aligns with an opening in a wall 78 of the stack 58 to allow the exhaust gases to pass into the stack 58.

The stack 58 has only about 20 percent as much working cross sectional area as a stack designed for an air- fuel fired furnace. This stack 58 comprises the front wall 78 having a entrance opening therein for the exhaust gases, a back wall 80, sidewalls 82, a reservoir 84 in the bottom portion of the stack 58, and a bottom wall 86. It is possible to make the stack of circular or oval cross section in which case a single cylindrical or oval wall would replace walls 78, 80 and 82. The top portion of the stack is not shown as it is conventional with no changes from the vertical portion shown above the exhaust port 56.

The bottom wall 86 has an opening or orifice 88 therein which extends entirely through the bottom wall 86. This orifice 88 is preferably round in horizontal cross section, but can be any shape. The inorganic volatiles in the exhaust gases cool as they move up the stack due to heat losses through the walls of the stack. When the gases contact a cooler wall some of the volatiles condense out on the walls forming a glassy liquid condensate or deposit 89. As the glassy condensate builds up, gravity and its low viscosity cause it to flow down the walls of the stack forming a slow moving glassy or slag layer 90. The glassy liquid 89 and layer 90 pick up batch particles carried out of the furnace by the exhaust gases, refractory particles and also dissolves some of the refractory at the surface of the stack walls. The slag 90 flows on down into the reservoir 84 and along the bottom wall 86, which preferably tapers slightly downwardly towards the center, forming a seal of molten slag or head of molten slag 91 in the orifice 88.

The reservoir 84 can be as deep as the reservoir 34 shown in FIG. 1, such as about 36 inches deep, but preferably is much shallower having walls 94 only about 3-12 inches high, and most preferably only about 6 inches high. The shallower reservoir stays much hotter than a deeper one which promotes the flow of glassy material or slag.

Figure 3:
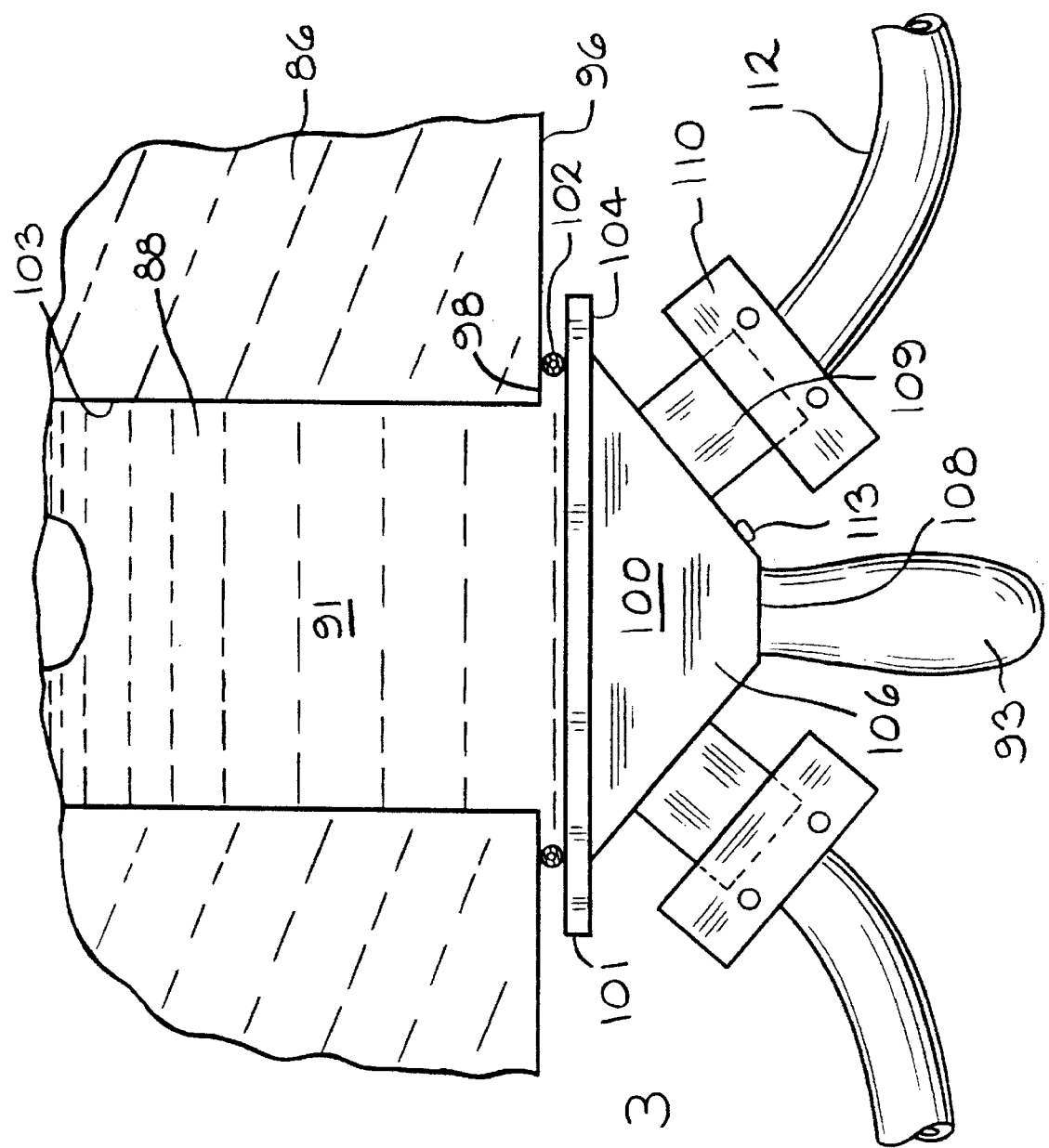
FIG. 3 is cross section of a preferred electrically heated drain bushing useful with the present invention.

The molten slag seal 91 is maintained with an electrically heated bushing 100 having a flange 101 that is pressed against a water cooled seal ring 102 and attached to the bottom wall 86 on its bottom surface 96 with conventional clamps in a known manner (see FIG. 3 for more detail of the bushing 100). The water cooled seal ring 102 is pressed against a portion 98 of the bottom wall surface 96 surrounding the orifice 88 by the bushing 100 and is spaced from the bottom edge of the orifice 88 far enough so as to not cool the molten slag 91 in the orifice 88 and the bushing 100 excessively, typically about one inch away from the lower edge of the orifice 88. The cooling seal or ring 102 is well known in the art and is a hollow metal tube, such as an Inconel tube, having an ID of about 0.25 inch and an OD of about 0.375 inch, but the size can vary depending on the conditions. The water cooled seal ring 102 runs almost all the way around the flange having an inlet section and an outlet section parallel to each other, in the same plane as the rest of the seal ring, and extending out past the flange 101 where a water supply line and a drain or return line is attached. The purpose of the cooling ring 102 is to freeze the slag that runs between flange 101 and bottom wall exterior surface portion 98 forming a seal to prevent any slag from leaking out between the bushing 100 and the bottom wall 86.

The bushing 100, as shown in FIG. 3, comprises a flange 101, a main body 106, which preferably is in the form of a funnel or a section of a cone, integral with or sealingly attached to the flange and having a bushing orifice or outlet 108 on its lower end, and two or more terminals 109 integral with or welded to the outside of the main body 106. The bushing 100 is heated to a temperature high enough to keep the slag 91 flowing fast enough to maintain a head, preferably of at least a few inches, in the orifice 88. The actual temperature will depend on the chemistry of the slag being produced, but for an E glass furnace is typically about 2100 degrees F. Once the suitable temperature is found the slag level in the orifice, or reservoir depending where one prefers to maintain the level, will tend to be self controlling since as the level increases the head will increase which will in turn increase the flow through the outlet 108, forming slag globs 93, and as the level decreases the head and flow decreases. It is preferred to maintain the level in the orifice because there the level or head changes faster and this reduces the chance of the slag level climbing too high and running into the exhaust port opening and exhaust port 56.

The bushing 100 is maintained at the desired temperature by passing an electrical current through the metal bushing in a known manner. Terminal blocks 110 are bolted or clamped tightly onto the terminals 109 in a known manner. The terminal blocks 110 are attached to electrical cables 112 which are in turn connected to an electrical power source modulated with a controller (not shown) to vary the power level to maintain the desired bushing temperature. Temperature feedback to the controller is provided by a conventional thermocouple 113 welded to the outer surface of the body 106 of the bushing 100 near the outlet 108.

While the bushing can be of many variations and many shapes, as one ordinarily skilled in the art of bushing design knows, the preferred specifications are as follows:

Bushing metal—Alloy of 90% platinum and 10% of Rhodium.
OD of flange 101—6 inches
Width of flange 101—1.06 inch
Thickness of flange 101—0.04 inch
ID of top of body 106—3.88 inches
ID of outlet 108—1.2 inches
Thickness of body 106—0.04 inch
Vertical height of body 106—3.5 inches
Angle of body 106 from vertical—21 degrees
Thickness of terminals 109—0.25 inch
Width of terminals 109 at body 106 end—1.38 inches
Width of terminals 109 at free end—1 inch (taper is only on edges closest to the flange 101)
Length of terminals 109—1.62 inches
Distance from outlet 108 to lower edge of terminals —1.25 inches.
Welds—90% platinum and 10% rhodium The bushing 100 is mounted in a conventional Inconel frame (not shown) using a conventional insulating refractory castable to cushion the body 106 and lower edge 104 of the flange 101 in a well known manner. The clamps that hold the bushing 100 onto the bottom wall 86 of the stack press against the conventional bushing frame in also a well known manner, for example as shown in FIG. 2 and related text of U.S. Pat. No. 3,920,430.

Using the invention as described, the stack is continuously or periodically drained of slag 91 with only occasional checking required. The globs of slag 93 fall into a scrap hopper 114 which is periodically dumped, thus eliminating an undesirable and hazardous problem and freeing up furnace maintenance people for more productive duties.

As will be readily recognized by those skilled in the art, this invention will also be applicable to variations of exhaust systems other than the stack where liquid slag accumulates. It will also be within the ordinary skill of the art to modify the actual dimensions, materials, shape and operation of the various parts of the disclosed invention while still practicing the invention disclosed and claimed. For example, the bushing can be made of refractory materials other than the metals disclosed and can be heated externally by electric elements, gas burners, etc., or can be heated internally with one or more burners.

I claim:

1. A furnace for melting glass comprising, a melting chamber for melting glass batch to form molten glass, an exhaust port for carrying hot exhaust gases to an exhaust stack and an exhaust stack, said stack communicating with said exhaust port, said stack having a reservoir in a bottom portion for collecting molten slag, which slag contains liquid resulting from condensation of volatiles from exhaust gases flowing from said melting chamber into said stack through said exhaust port, an orifice for removing the molten slag from said reservoir in or near a bottom wall of said reservoir, a heated bushing for draining said molten slag out of said reservoir, said bushing having an outlet and being affixed such that said bushing communicates with said orifice, and a scrap hopper for receiving said slag as it exits from said bushing.

2. The furnace of claim 1 wherein said orifice is in said bottom wall of said reservoir.

3. The furnace of claim 1 wherein said bushing is electrically heated.

4. The furnace of claim 3 wherein said furnace also comprises an oxy-fuel firing system in said work chamber.

5. The furnace of claim 4 wherein said reservoir has a depth of less than 12 inches from a bottom of an exhaust inlet to an interior surface of the bottom wall of said reservoir.

6. The furnace of claim 2 wherein said interior surface of said bottom wall of said reservoir tapers downwardly to said orifice.

7. A method of removing molten slag from a bottom portion of an exhaust system for removing hot exhaust gases from a glass melting chamber through an exhaust port to an exhaust stack, said slag containing condensation volatiles from the exhaust gases from the exhaust system by placing an orifice in a wall of a reservoir located in a bottom portion of said exhaust system where the molten slag is collected comprising placing a heated bushing having an inlet and an outlet in communication with said orifice and heating said bushing to cause said molten slag to flow through said bushing and out of said exhaust system into a scrap hopper.

8. The method of claim 7 wherein said bushing is electrically heated.

9. The method of claim 7 wherein said bushing is maintained at a temperature that keeps a slag level within a desired range.

10. The method of claim 9 wherein said bushing is maintained at a temperature that will keeps a slag level within a desired range.

11. The method of claim 7 wherein said bushing is electrically heated by the resistance of an electrical current running through said bushing.

\* \* \* \* \*